US011647108B2

(12) United States Patent
Li

(10) Patent No.: US 11,647,108 B2
(45) Date of Patent: May 9, 2023

(54) SERVICE PROCESSING METHOD AND APPARATUS

(71) Applicant: Huawei Technologies Co., Ltd., Shenzhen (CN)

(72) Inventor: Zijun Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/084,491

(22) PCT Filed: Mar. 15, 2016

(86) PCT No.: PCT/CN2016/076425
§ 371 (c)(1),
(2) Date: Sep. 12, 2018

(87) PCT Pub. No.: WO2017/156713
PCT Pub. Date: Sep. 21, 2017

(65) Prior Publication Data
US 2019/0082048 A1 Mar. 14, 2019

(51) Int. Cl.
*H04M 1/724* (2021.01)
*H04W 8/24* (2009.01)
(Continued)

(52) U.S. Cl.
CPC ............. *H04M 1/724* (2021.01); *G06F 8/61* (2013.01); *H04L 65/40* (2013.01); *H04L 67/34* (2013.01);
(Continued)

(58) Field of Classification Search
CPC ...... H04M 1/72583; G06F 8/61; H04L 67/16; H04L 67/34; H04W 8/24
(Continued)

(56) References Cited

U.S. PATENT DOCUMENTS 8,365,164 B1 * 1/2013 Morgenstern ............. G06F 8/61
717/175
9,924,102 B2 * 3/2018 Gervautz ........... H04N 5/23296
(Continued)

FOREIGN PATENT DOCUMENTS

CN 101495963 A 7/2009
CN 102348004 A * 2/2012
(Continued)

OTHER PUBLICATIONS

Machine Translation and Abstract of Chinese Publication No. CN102348004, Feb. 8, 2012, 14 pages.
(Continued)

*Primary Examiner* — Margaret G Mastrodonato
*Assistant Examiner* — Nicole M Louis-Fils
(74) *Attorney, Agent, or Firm* — Conley Rose, P.C.

(57) ABSTRACT

A service processing method and a terminal, where the terminal obtains identification information of a to-be-processed service, and sends a retrieval request message to a server after determining that no function corresponding to the identification information of the to-be-processed service exists in an application program installed on the terminal. The terminal receives a target function from the server, and invokes the target function to process the to-be-processed service. The terminal sends the retrieval request message to the server only after determining that no corresponding function exists such that the terminal does not need to obtain a web application from the server each time. In addition, the terminal receives the target function from the server such that traffic and a download time are effectively reduced.

10 Claims, 7 Drawing Sheets

(51) Int. Cl.
  *H04M 1/72469*   (2021.01)
  *H04L 65/40*     (2022.01)
  *H04L 67/51*     (2022.01)
  *G06F 8/61*      (2018.01)
  *H04L 67/00*     (2022.01)
  *H04M 1/72454*   (2021.01)

(52) U.S. Cl.
  CPC ........ *H04L 67/51* (2022.05); *H04M 1/72469* (2021.01); *H04W 8/24* (2013.01); *H04M 1/72454* (2021.01)

(58) Field of Classification Search
  USPC .......................................... 455/418
  See application file for complete search history.

(56) References Cited

U.S. PATENT DOCUMENTS

| | | | |
|---|---|---|---|
| 2007/0180449 A1* | 8/2007 | Croft ................ | H04L 67/2819 718/1 |
| 2008/0027945 A1 | 1/2008 | Nichols | |
| 2010/0306762 A1* | 12/2010 | Lindberg ............. | H04L 67/34 717/176 |
| 2011/0153697 A1* | 6/2011 | Nickolov ............. | H04L 69/32 707/827 |
| 2013/0191179 A1* | 7/2013 | Yan ..................... | G06Q 30/02 705/7.31 |
| 2013/0254369 A1* | 9/2013 | Rogel ................. | G06F 9/45558 709/223 |
| 2013/0298185 A1 | 11/2013 | Koneru et al. | |
| 2013/0346965 A1* | 12/2013 | Conlan ................ | G06F 8/61 717/178 |
| 2014/0267770 A1* | 9/2014 | Gervautz ........... | H04N 5/23296 348/169 |
| 2015/0156257 A1 | 6/2015 | Li et al. | |
| 2015/0156275 A1 | 6/2015 | Audebert et al. | |
| 2015/0193215 A1* | 7/2015 | Jianu .................. | H04L 63/123 717/177 |
| 2016/0299755 A1 | 10/2016 | Yang et al. | |
| 2016/0316088 A1* | 10/2016 | Negoro .............. | H04N 1/00411 |
| 2017/0187838 A1* | 6/2017 | Sankaranarasimhan .............. | H04L 63/00 |

FOREIGN PATENT DOCUMENTS

| | | |
|---|---|---|
| CN | 102348004 A | 2/2012 |
| CN | 102541598 A | 7/2012 |
| CN | 102594859 A | 7/2012 |
| CN | 102932441 A | 2/2013 |
| CN | 103246532 A | 8/2013 |
| CN | 103500266 A | 1/2014 |
| CN | 104412225 A | 3/2015 |
| CN | 104657164 A | 5/2015 |
| CN | 104731607 A | 6/2015 |
| CN | 105144197 A | 12/2015 |
| WO | 2015090062 A1 | 6/2015 |

OTHER PUBLICATIONS

Machine Translation and Abstract of Chinese Publication No. CN102541598, Jul. 4, 2012, 13 pages.
Machine Translation and Abstract of Chinese Publication No. CN102594859, Jul. 18, 2012, 18 pages.
Machine Translation and Abstract of Chinese Publication No. CN102932441, Feb. 13, 2013, 30 pages.
Machine Translation and Abstract of Chinese Publication No. CN103246532, Aug. 14, 2013, 14 pages.
Machine Translation and Abstract of Chinese Publication No. CN103500266, Jan. 8, 2014, 13 pages.
Machine Translation and Abstract of Chinese Publication No. CN104657164, May 27, 2015, 13 pages.
Foreign Communication From a Counterpart Application, PCT Application No. PCT/CN2016/076425, English Translation of International Search Report dated Nov. 28, 2016, 3 pages.
Foreign Communication From a Counterpart Application, PCT Application No. PCT/CN2016/076425, English Translation of Written Opinion dated Nov. 28, 2016, 4 pages.
Foreign Communication From a Counterpad Application, European Application No. 16893878.5, Extended European Search Report dated Nov. 8, 2018, 8 pages.
Machine Translation and Abstract of Chinese Publication No. CN101495963, Jul. 29, 2009, 22 pages.
Machine Translation and Abstract of Chinese Publication No. CN104412225, Mar. 11, 2015, 18 pages.
Machine Translation and Abstract of Chinese Publication No. CN104731607, Jun. 24, 2015, 16 pages.
Machine Translation and Abstract of Chinese Publication No. CN105144197, Dec. 9, 2015, 57 pages.
Foreign Communication From a Counterpart Application, Chinese Application No. 201680024832.4, Chinese Office Action dated Sep. 4, 2019, 8 pages.

\* cited by examiner

SERVICE PROCESSING METHOD AND APPARATUS

CROSS-REFERENCE TO RELATED APPLICATIONS

This application is a U.S. National Stage of International Patent Application No. PCT/CN2016/076425 filed on Mar. 15, 2016, which is hereby incorporated by reference in its entirety.

TECHNICAL FIELD

The present invention relates to the field of communications technologies, and in particular, to a service processing method and an apparatus.

BACKGROUND

Currently, application programs on an intelligent terminal have different application forms. One of the application forms is a native (Native) application. The native application is developed for a development interface of a specific operating system and target code supported by the operating system, and can be used by a user only after being downloaded to the intelligent terminal and being installed. As a storage capability of the intelligent terminal and network transmission bandwidth are increasing, a processing capability of the intelligent terminal is also increasing, and an application program with more functions is installed on the intelligent terminal. To meet an increasing functional requirement of the user, an installation package of the native application is larger, and is generally dozens of M bytes or even hundreds of M bytes. However, the user usually uses only some functions of an application program, or uses only some functions of an application program only at a moment or in a place, but the user needs to download a complete application program to the intelligent terminal. Consequently, a large amount of traffic is consumed, a download time is relatively long, and use efficiency is relatively low. The use efficiency refers to a ratio of storage space occupied by a used function of an application program in all storage space occupied by the application program. Higher use efficiency is of larger value to storage space, network traffic consumption, and a time for waiting for installation.

In conclusion, in the prior art, when the intelligent terminal processes a service by using the native application, an application program installation package is excessively large, and use efficiency is low.

SUMMARY

Embodiments of the present invention provide a service processing method, so as to resolve a prior-art technical problem that when a terminal processes a service by using a native application, an application program installation package is excessively large, and use efficiency is low.

An embodiment of the present invention provides a service processing method, including:

obtaining, by a terminal, identification information of a to-be-processed service;

sending, by the terminal, a retrieval request message to a server after determining that no function module corresponding to the identification information of the to-be-processed service exists in an application program installed on the terminal, where the application program is a program framework without a service processing function, and the retrieval request message includes the identification information of the to-be-processed service;

receiving, by the terminal, a response message returned by the server, where the response message includes a target function module corresponding to the identification information of the to-be-processed service; and invoking, by the terminal, the target function module to process the to-be-processed service.

Therefore, after obtaining the identification information of the to-be-processed service, the terminal first determines whether a function module corresponding to the to-be-processed service exists in the installed application program, and sends the retrieval request message to the server only when no function module corresponding to the to-be-processed service exists in the installed application program, so that the terminal does not need to obtain a web application from the server each time. In addition, the terminal receives the target function module returned by the server, instead of an application program installation package (that may include content unrelated to a functional requirement this time), so that traffic and a download time are effectively reduced. Because the target function module is highly pertinent, in this way, use efficiency of the application program is dramatically increased while processing the to-be-processed service is completed.

Preferably, after determining that a function module corresponding to the identification information of the to-be-processed service exists in the application program installed on the terminal, the terminal invokes the function module corresponding to the identification information of the to-be-processed service to process the to-be-processed service.

Therefore, after determining that a function module corresponding to the identification information of the to-be-processed service exists in the installed application program, the terminal directly invokes the function module to process the to-be-processed service, and does not need to obtain an application program from the server again. Therefore, a cumulative effect is achieved, and a problem that web applications cannot be accumulated on the terminal is avoided.

Preferably, after the receiving, by the terminal, a response message returned by the server, before the invoking the target function module to process the to-be-processed service, the method further includes:

if an application program that matches the target function module exists in the installed application program, adding the target function module to the matched application program; and the invoking, by the terminal, the target function module to process the to-be-processed service includes:

invoking, by the terminal, the target function module added to the installed application program, to process the to-be-processed service.

Therefore, if an application program that matches the target function module exists in the installed application program, the terminal may directly add the received target function module to the matched application program, and does not need to install a new application program, so that processing efficiency is increased, and function modules are classified by using an application program.

Preferably, after the receiving, by the terminal, a response message returned by the server, before the invoking the target function module to process the to-be-processed service, the method further includes:

if no application program that matches the target function module exists in the installed application program, installing a new application program, and adding the target function module to the newly installed application program; and the invoking, by the terminal, the target function module to process the to-be-processed service includes:

invoking, by the terminal, the target function module added to the newly installed application program to process the to-be-processed service.

Therefore, the new application program created by the terminal may be referred to as a shell program, and the shell program is similar to an app in an existing Android system. A management program on the terminal creates the shell program, for example, creates the shell program by copying pseudocode, and then mounts the foregoing target function module and another function module onto the shell program. An interface between the shell program and the function module may be a pre-defined standard interface.

Preferably, the obtaining, by a terminal, identification information of a to-be-processed service includes:

receiving, by the terminal, input information of a user, and obtaining the identification information of the to-be-processed service from the input information.

Therefore, considering that the to-be-processed service may be a service initiated by the user by using the input information, the terminal may receive the input information of the user to identify the to-be-processed service.

Preferably, the obtaining, by a terminal, identification information of a to-be-processed service includes:

obtaining, by the terminal, information about a sensor, and obtaining the identification information of the to-be-processed service according to the information about the sensor.

Therefore, considering that the to-be-processed service may be a service triggered by data information detected by the sensor, the terminal may obtain the information about the sensor to identify the to-be-processed service.

Preferably, the information about the sensor includes data information collected by the sensor and a function attribute of the sensor; and the obtaining, by the terminal, information about a sensor, and obtaining the identification information of the to-be-processed service according to the information about the sensor includes:

after determining, according to the function attribute of the sensor, that the data information does not meet a normal preset condition corresponding to the function attribute, obtaining, by the terminal, a first keyword corresponding to the data information and at least one preset second keyword corresponding to the function attribute of the sensor; and using, by the terminal, the first keyword and the at least one second keyword as the identification information of the to-be-processed service.

Therefore, when determining the to-be-processed service according to the information about the sensor, the terminal performs a step of obtaining the first keyword and the second keyword only after determining that the data information does not meet the normal preset condition corresponding to the function attribute of the sensor, so that processing resources can be effectively reduced by properly arranging an execution order, and the following case can be effectively avoided: Because the data information meets the normal preset condition, the determined second keyword is invalid. In addition, in this embodiment of the present invention, two aspects, that is, the first keyword corresponding to the data information and the preset second keyword corresponding to the function attribute of the sensor are comprehensively considered, so that the determined to-be-processed service is more accurate.

Preferably, the data information includes data collected by the sensor at different moments.

Therefore, the terminal obtains data information collected by the sensor at different moments, and determines the first keyword according to analysis of accumulated data information of multiple times. For example, if at least half of the data information collected for multiple times is corresponding to a same keyword, the keyword may be determined as the first keyword. Therefore, a problem that the subsequently determined to-be-processed service is inaccurate because an error exists in the data collected by the sensor can be effectively avoided.

An embodiment of the present invention provides another service processing method, and the method includes:

receiving, by a server, a retrieval request message sent by a terminal, where the retrieval request message is sent after the terminal determines that no function module corresponding to identification information of a to-be-processed service exists in an application program installed on the terminal, and the retrieval request message includes the identification information of the to-be-processed service;

obtaining, by the server according to the identification information of the to-be-processed service, a target function module corresponding to the identification information of the to-be-processed service from a function module library; and sending, by the server, a response message that includes the target function module to the terminal, so that the terminal invokes the target function module to process the to-be-processed service.

Therefore, the server receives the retrieval request message sent by the terminal, and the retrieval request message is sent after the terminal determines that no function module corresponding to the identification information of the to-be-processed service exists in the application program installed on the terminal. The server obtains, according to the identification information that is of the to-be-processed service and that is in the retrieval request message, the target function module corresponding to the identification information of the to-be-processed service from the function module library, and sends the response message that includes the target function module to the terminal, so that the terminal invokes the target function module to process the to-be-processed service. In this embodiment of the present invention, the terminal first determines whether a function module corresponding to the to-be-processed service exists in the installed application program, and sends the retrieval request message to the server only when no function module corresponding to the to-be-processed service exists in the installed application program, so that the terminal does not need to obtain a web application from the server each time. In addition, the server returns the target function module to the terminal, instead of an application program installation package (that may include content unrelated to a functional requirement this time), so that traffic and a download time of the terminal are effectively reduced. Because the target function module is highly pertinent, in this way, use efficiency of the application program is dramatically increased while processing the to-be-processed service is completed.

Preferably, the function module library includes one or more function modules; and the obtaining, by the server according to the identification information of the to-be-processed service, a target function module corresponding to the identification information of the to-be-processed service from a function module library includes:

obtaining, by the server, attribute information of each function module in the function module library;

comparing, by the server, the identification information of the to-be-processed service with the attribute information of each function module in the function module library, to obtain similarity between the identification information of the to-be-processed service and the attribute information of each function module; and determining, by the server, a function module corresponding to highest similarity as the target function module.

Therefore, when performing retrieval in the function module library, the server compares the identification information of the to-be-processed service with the attribute information of each function module in the function module library, and determines the target function module according to a comparison result. In this traversal retrieval manner, the target function module can be accurately determined.

An embodiment of the present invention provides a terminal, including:

a processing module, configured to: obtain identification information of a to-be-processed service, and determine whether a function module corresponding to the identification information of the to-be-processed service exists in an application program installed on the terminal;

a sending module, configured to send a retrieval request message to a server after the processing module determines that no function module corresponding to the identification information of the to-be-processed service exists in the application program installed on the terminal, where the retrieval request message includes the identification information of the to-be-processed service; and a receiving module, configured to receive a response message returned by the server, where the response message includes a target function module corresponding to the identification information of the to-be-processed service; where the processing module is further configured to invoke the target function module to process the to-be-processed service.

Therefore, after obtaining the identification information of the to-be-processed service, the terminal first determines whether a function module corresponding to the to-be-processed service exists in the installed application program, and sends the retrieval request message to the server only when no function module corresponding to the to-be-processed service exists in the installed application program, so that the terminal does not need to obtain a web application from the server each time. In addition, the terminal receives the target function module returned by the server, instead of an application program installation package (that may include content unrelated to a functional requirement this time), so that traffic and a download time are effectively reduced. Because the target function module is highly pertinent, in this way, use efficiency of the application program is dramatically increased while processing the to-be-processed service is completed.

Preferably, the processing module is further configured to:

after determining that a function module corresponding to the identification information of the to-be-processed service exists in the installed application program, invoke the function module corresponding to the identification information of the to-be-processed service to process the to-be-processed service.

Therefore, after determining that a function module corresponding to the identification information of the to-be-processed service exists in the installed application program, the terminal directly invokes the function module to process the to-be-processed service, and does not need to obtain an application program from the server again. Therefore, a cumulative effect is achieved, and a problem that web applications cannot be accumulated on the terminal is avoided.

Preferably, after the receiving module receives the response message returned by the server, before the processing module invokes the target function module to process the to-be-processed service, the processing module is further configured to:

if an application program that matches the target function module exists in the installed application program, add the target function module to the matched application program; and invoke the target function module added to the installed application program, to process the to-be-processed service.

Therefore, if an application program that matches the target function module exists in the installed application program, the terminal may directly add the received target function module to the matched application program, and does not need to install a new application program, so that processing efficiency is increased, and function modules are classified by using an application program.

Preferably, after the receiving module receives the response message returned by the server, before the processing module invokes the target function module to process the to-be-processed service, the processing module is further configured to:

if no application program that matches the target function module exists in the installed application program, install a new application program, and add the target function module to the newly installed application program; and invoke the target function module added to the newly installed application program to process the to-be-processed service.

Therefore, the new application program created by the terminal may be referred to as a shell program, and the shell program is similar to an app in an existing Android system. A management program on the terminal creates the shell program, for example, creates the shell program by copying pseudocode, and then mounts the foregoing target function module and another function module onto the shell program. An interface between the shell program and the function module may be a pre-defined standard interface.

Preferably, the receiving module is further configured to receive input information of a user; and the processing module is specifically configured to obtain the identification information of the to-be-processed service from the input information.

Preferably, the processing module is specifically configured to: obtain information about a sensor, and obtain the identification information of the to-be-processed service according to the information about the sensor.

Preferably, the processing module is specifically configured to:

obtain data information collected by the sensor and a function attribute of the sensor;

after it is determined, according to the function attribute of the sensor, that the data information does not meet a normal preset condition corresponding to the function attribute, obtain a first keyword corresponding to the data information and at least one preset second keyword corresponding to the function attribute of the sensor; and use the first keyword and the at least one second keyword as the identification information of the to-be-processed service.

Therefore, when determining the to-be-processed service according to the information about the sensor, the terminal performs a step of obtaining the first keyword and the second keyword only after determining that the data information does not meet the normal preset condition corresponding to the function attribute of the sensor, so that processing resources can be effectively reduced by properly arranging an execution order, and the following case can be effectively avoided: Because the data information meets the normal preset condition, the determined second keyword is invalid. In addition, in this embodiment of the present invention, two aspects, that is, the first keyword corresponding to the data information and the preset second keyword corresponding to the function attribute of the sensor are comprehensively considered, so that the determined to-be-processed service is more accurate.

Preferably, the data information includes data collected by the sensor at different moments.

Therefore, the terminal obtains data information collected by the sensor at different moments, and determines the first keyword according to analysis of accumulated data information of multiple times. For example, if at least half of the data information collected for multiple times is corresponding to a same keyword, the keyword may be determined as the first keyword. Therefore, a problem that the subsequently determined to-be-processed service is inaccurate because an error exists in the data collected by the sensor can be effectively avoided.

An embodiment of the present invention provides a server, and the server includes:

a receiving module, configured to receive a retrieval request message sent by a terminal, where the retrieval request message is sent after the terminal determines that no function module corresponding to identification information of a to-be-processed service exists in an application program installed on the terminal, and the retrieval request message includes the identification information of the to-be-processed service;

an obtaining module, configured to obtain, according to the identification information of the to-be-processed service, a target function module corresponding to the identification information of the to-be-processed service from a function module library; and a sending module, configured to send a response message that includes the target function module to the terminal, so that the terminal invokes the target function module to process the to-be-processed service.

Therefore, after receiving the retrieval request message that includes the identification information of the to-be-processed service and that is sent by the terminal, the server obtains the target function module corresponding to the identification information of the to-be-processed service from the function module library, and sends the target function module to the terminal. The server sends the target function module to the terminal instead of sending an application program installation package (that may include content unrelated to a functional requirement this time) to the terminal, so that traffic and a download time of the terminal are effectively reduced. Because the target function module is highly pertinent, in this way, use efficiency of the application program is dramatically increased while the terminal completes processing the to-be-processed service.

Preferably, the function module library is located on the server, and the function module library includes one or more function modules; and the obtaining module is specifically configured to:

obtain attribute information of each function module in the function module library;

compare the identification information of the to-be-processed service with the attribute information of each function module in the function module library, to obtain similarity between the identification information of the to-be-processed service and the attribute information of each function module; and determine a function module corresponding to highest similarity as the target function module.

Therefore, when performing retrieval in the function module library, the server compares the identification information of the to-be-processed service with the attribute information of each function module in the function module library, and determines the target function module according to a comparison result. In this traversal retrieval manner, the target function module can be accurately determined.

An embodiment of the present invention provides another terminal, and the terminal includes:

a processor, configured to: obtain identification information of a to-be-processed service, and determine whether a function module corresponding to the identification information of the to-be-processed service exists in an application program installed on the terminal;

a transmitter, configured to send a retrieval request message to a server after the processor determines that no function module corresponding to the identification information of the to-be-processed service exists in the application program installed on the terminal, where the retrieval request message includes the identification information of the to-be-processed service; and a receiver, configured to receive a response message returned by the server, where the response message includes a target function module corresponding to the identification information of the to-be-processed service; where the processor is further configured to invoke the target function module to process the to-be-processed service.

Therefore, after obtaining the identification information of the to-be-processed service, the terminal first determines whether a function module corresponding to the to-be-processed service exists in the installed application program, and sends the retrieval request message to the server only when no function module corresponding to the to-be-processed service exists in the installed application program, so that the terminal does not need to obtain a web application from the server each time. In addition, the terminal receives the target function module returned by the server, instead of an application program installation package (that may include content unrelated to a functional requirement this time), so that traffic and a download time are effectively reduced. Because the target function module is highly pertinent, in this way, use efficiency of the application program is dramatically increased while processing the to-be-processed service is completed.

Preferably, the processor is further configured to:

after determining that a function module corresponding to the identification information of the to-be-processed service exists in the installed application program, invoke the function module corresponding to the identification information of the to-be-processed service to process the to-be-processed service.

Preferably, after the receiver receives the response message returned by the server, before the processor invokes the target function module to process the to-be-processed service, the processor is further configured to:

if an application program that matches the target function module exists in the installed application program, add the target function module to the matched application program; and invoke the target function module added to the installed application program, to process the to-be-processed service.

Preferably, after the receiver receives the response message returned by the server, before the processor invokes the target function module to process the to-be-processed service, the processor is further configured to:

if no application program that matches the target function module exists in the installed application program, install a new application program, and add the target function module to the newly installed application program; and invoke the target function module added to the newly installed application program to process the to-be-processed service.

Preferably, the terminal further includes an input device, configured to:

receive input information of a user; where when obtaining the identification information of the to-be-processed service, the processor is specifically configured to obtain the identification information of the to-be-processed service from the input information.

Preferably, when obtaining the identification information of the to-be-processed service, the processor is specifically configured to: obtain information about a sensor, and obtain the identification information of the to-be-processed service according to the information about the sensor.

Preferably, when obtaining the identification information of the to-be-processed service, the processor is specifically configured to:

obtain data information collected by the sensor and a function attribute of the sensor;

after it is determined, according to the function attribute of the sensor, that the data information does not meet a normal preset condition corresponding to the function attribute, obtain a first keyword corresponding to the data information and at least one preset second keyword corresponding to the function attribute of the sensor; and use the first keyword and the at least one second keyword as the identification information of the to-be-processed service.

Preferably, the data information includes data collected by the sensor at different moments.

An embodiment of the present invention provides another server, including:

a receiver, configured to receive a retrieval request message sent by a terminal, where the retrieval request message is sent after the terminal determines that no function module corresponding to identification information of a to-be-processed service exists in an application program installed on the terminal, and the retrieval request message includes the identification information of the to-be-processed service;

a processor, configured to obtain, according to the identification information of the to-be-processed service, a target function module corresponding to the identification information of the to-be-processed service from a function module library; and a transmitter, configured to send a response message that includes the target function module to the terminal, so that the terminal invokes the target function module to process the to-be-processed service.

Therefore, after receiving the retrieval request message that includes the identification information of the to-be-processed service and that is sent by the terminal, the server obtains the target function module corresponding to the identification information of the to-be-processed service from the function module library, and sends the target function module to the terminal. The server sends the target function module to the terminal instead of sending an application program installation package (that may include content unrelated to a functional requirement this time) to the terminal, so that traffic and a download time of the terminal are effectively reduced. Because the target function module is highly pertinent, in this way, use efficiency of the application program is dramatically increased while the terminal completes processing the to-be-processed service.

Preferably, the function module library is located on the server, and the function module library includes one or more function modules; and the processor is specifically configured to:

obtain attribute information of each function module in the function module library;

compare the identification information of the to-be-processed service with the attribute information of each function module in the function module library, to obtain similarity between the identification information of the to-be-processed service and the attribute information of each function module; and determine a function module corresponding to highest similarity as the target function module.

In the embodiments of the present invention, the terminal obtains the identification information of the to-be-processed service, and sends the retrieval request message to the server after determining that no function module corresponding to the identification information of the to-be-processed service exists in the application program installed on the terminal. The terminal receives the target function module returned by the server, and invokes the target function module to process the to-be-processed service. In the embodiments of the present invention, the terminal first determines whether a function module corresponding to the to-be-processed service exists in the installed application program, and sends the retrieval request message to the server only when no function module corresponding to the to-be-processed service exists in the installed application program, so that the terminal does not need to obtain a web application from the server each time. In addition, the terminal receives the target function module returned by the server, instead of an application program installation package (that may include content unrelated to a functional requirement this time), so that traffic and a download time are effectively reduced. Because the target function module is highly pertinent, in this way, use efficiency of the application program is dramatically increased while processing the to-be-processed service is completed.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DESCRIPTION OF EMBODIMENTS

To make the objectives, technical solutions, and advantages of the present invention clearer and more comprehensible, the following further describes the present invention in detail with reference to the accompanying drawings and embodiments. It should be understood that the specific embodiments described herein are merely used to explain the present invention but are not intended to limit the present invention.

Figure 1:
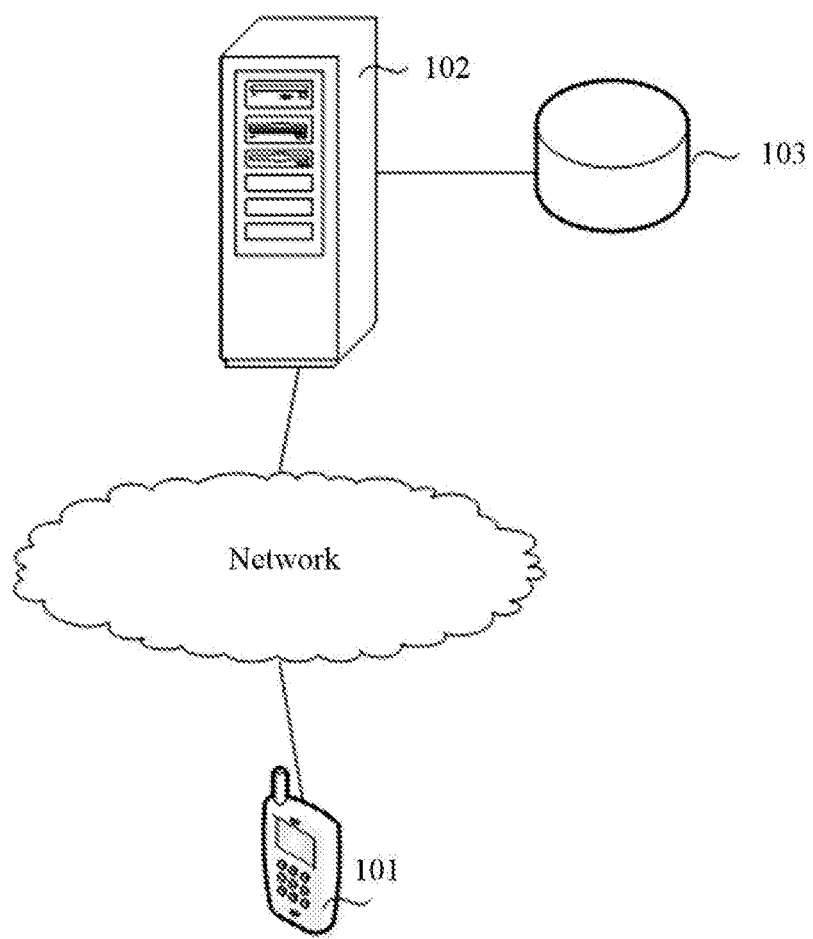
FIG. 1 is a schematic diagram of a system architecture to which an embodiment of the present invention is applicable.

FIG. 1 shows an example of a schematic diagram of a system architecture to which an embodiment of the present invention is applicable. As shown in FIG. 1, the system architecture includes a terminal 101, a server 102, and a function module library 103. The function module library 103 may be integrated into the server 102, or may be independent of the server 102. The server has permission to access the function module library. The terminal 101 may communicate with the server 102 by using a WLAN, a cellular network, or a wired network.

A terminal in this embodiment of the present invention may be a device that can support a function module being mounted onto an application program, such as a handheld device, an in-vehicle device, a wearable device, a computing device, various types of user equipment (User Equipment, UE for short), a mobile station (Mobile station, MS for short), a terminal (terminal), or a terminal device (Terminal Equipment) that can support a function module being mounted onto an application program. Specifically, the device is, for example, a mobile phone, a tablet computer, a portable computer, a desk computer, or the like. For ease of description, the device is referred to as a terminal in this embodiment of the present invention.

Figure 2:
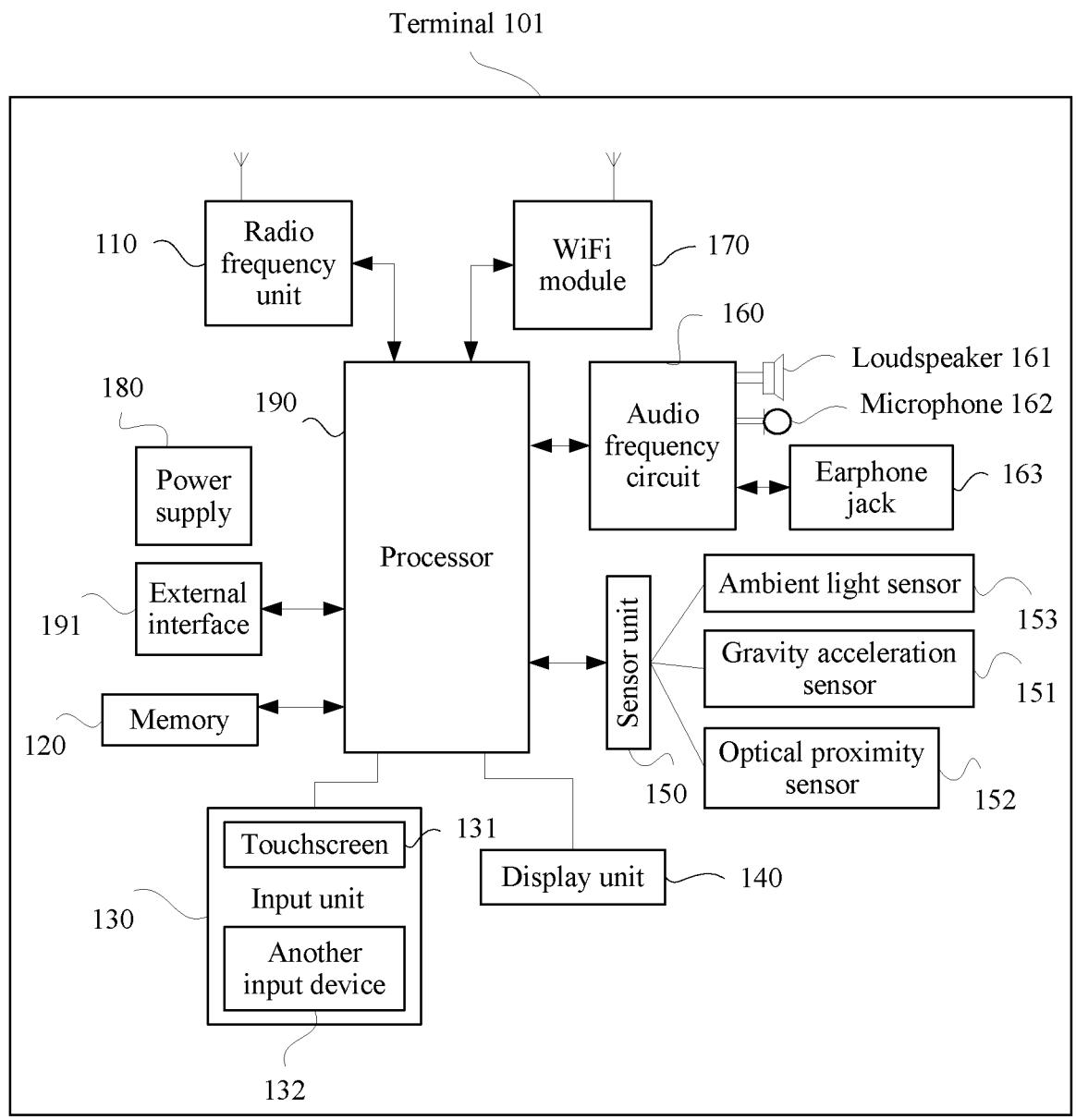
FIG. 2 is a block diagram of a terminal according to an embodiment of the present invention.

FIG. 2 is a block diagram of a terminal according to an embodiment of the present invention. The terminal 101 may include components such as an input unit 130, a display unit 140, a sensor unit 150, a memory 120, a processor 190, a radio frequency unit 110, an audio frequency circuit 160, a loudspeaker 161, a microphone 162, a WiFi (wireless fidelity, Wireless Fidelity) module 170, a power supply 180, and an external interface 191.

Persons skilled in the art may understand that FIG. 2 is only an example of a terminal, and imposes no limitation on the terminal. An actual terminal may include more or fewer components than those shown in the figure, or a combination of some components, or components differently disposed.

The input unit 130 may be configured to receive entered digital or character information, and generate key signal input related to user setting and function control of the terminal. Specifically, the input unit 130 may include a touchscreen 131 and another input device 132. The touchscreen 131 may collect a touch operation performed by a user on or near the touchscreen 131 (such as an operation performed by the user on the touchscreen or near the touchscreen by using any proper object such as a finger, a joint, or a stylus), and drive a corresponding connected apparatus according to a preset program. The touchscreen may detect the touch action performed by the user on the touchscreen, convert the touch action into a touch signal, send the touch signal to the processor 190, and can receive and execute a command sent by the processor 190. The touch signal includes at least contact coordinate information. The touchscreen 131 may provide an input user interface and an output user interface between the terminal 101 and the user. In addition, the touchscreen may be implemented by using multiple types such as a resistive type, a capacitive type, an infrared ray, and a surface acoustic wave. In addition to the touchscreen 131, the input unit 130 may include the another input device. Specifically, the another input device 132 may include but be not limited to one or more of a physical keyboard, a function key (such as a volume control key 132 or an on/off key 133), a trackball, a mouse, a joystick, a microphone, or a camera. In this embodiment of the present invention, the input unit 130 is mainly configured to obtain input information of the user, so as to obtain identification information of a to-be-processed service from the input information.

The display unit 140 may be configured to display information entered by the user or information provided for the user and various menus of the terminal 101. Further, the touchscreen 131 may cover a display panel 141. After detecting a touch operation on or near the touchscreen 131, the touchscreen 131 transmits the touch operation to the processor 190, so that a type of a touch event can be determined, and then, the processor 190 provides corresponding visual output on the display panel 141 according to the type of the touch event. In this embodiment, the touchscreen and the display unit may be integrated into one component to implement input, output, and display functions of the terminal 101. For ease of description, in this embodiment of the present invention, the touchscreen represents a function set of the touchscreen and the display unit. In some embodiments, the touchscreen and the display unit may be used as two independent components. In this embodiment of the present invention, the display unit 140 is mainly configured to display a user interface of an application program generated by the terminal 101, a processing result of the terminal 101, and information fed back to the user.

The sensor unit 150 includes one or more sensors (that send collected data information to the terminal by means of data transmission) that may be disposed in the terminal or may be disposed outside the terminal. The sensor unit 150 is mainly configured to detect data such as a motion status and a physiological indicator of the user, or detect environment information such as environment temperature, humidity, and air quality. For example, the sensor unit 150 may include a gravity acceleration sensor 151, an optical proximity sensor 152, an ambient light sensor 153, and the like.

Specifically, the gravity acceleration sensor 151 may detect magnitudes of acceleration in all directions (generally on three axes), and the gravity acceleration sensor 151 may be further configured to detect a value and a direction of gravity at rest, and may be applied to an application used for identifying a terminal posture (for example, screen switching between a landscape mode and a portrait mode, a related game, or magnetometer posture calibration), a function related to vibration identification (such as a pedometer or a knock), and the like. In this embodiment of the present invention, the gravity acceleration sensor 151 is configured to obtain gravity acceleration that is in a direction of a z-axis and that is obtained when a touch action is performed by the user on the touchscreen, so as to identify input of the user.

The optical proximity sensor 152 is configured to: when the terminal 101 is close to the user (for example, is close to an ear when the user is being on a call), turn off and disable the touchscreen to prevent the user from performing misoperation on the touchscreen. The ambient light sensor 153 is configured to keep the touchscreen off when the terminal 101 is located in a pocket of the user or another dark area, so that when the terminal 101 is in a locked state, unnecessary battery power consumption and misoperation are avoided. In some embodiments, the optical proximity sensor and the ambient light sensor may be integrated into one component, or may be used as two independent components. For other sensors, such as a gyroscope, a barometer, a hygrometer, a thermometer, and an infrared sensor, that may be further configured on the terminal 101, details are not described herein. Although the gravity acceleration sensor, the optical proximity sensor, and the ambient light sensor are shown in FIG. 3, it may be understood that the gravity acceleration sensor, the optical proximity sensor, and the ambient light sensor are not mandatory components of the terminal 101, and may be omitted according to a requirement provided that the essence of the present invention is not changed.

Figure 3A:
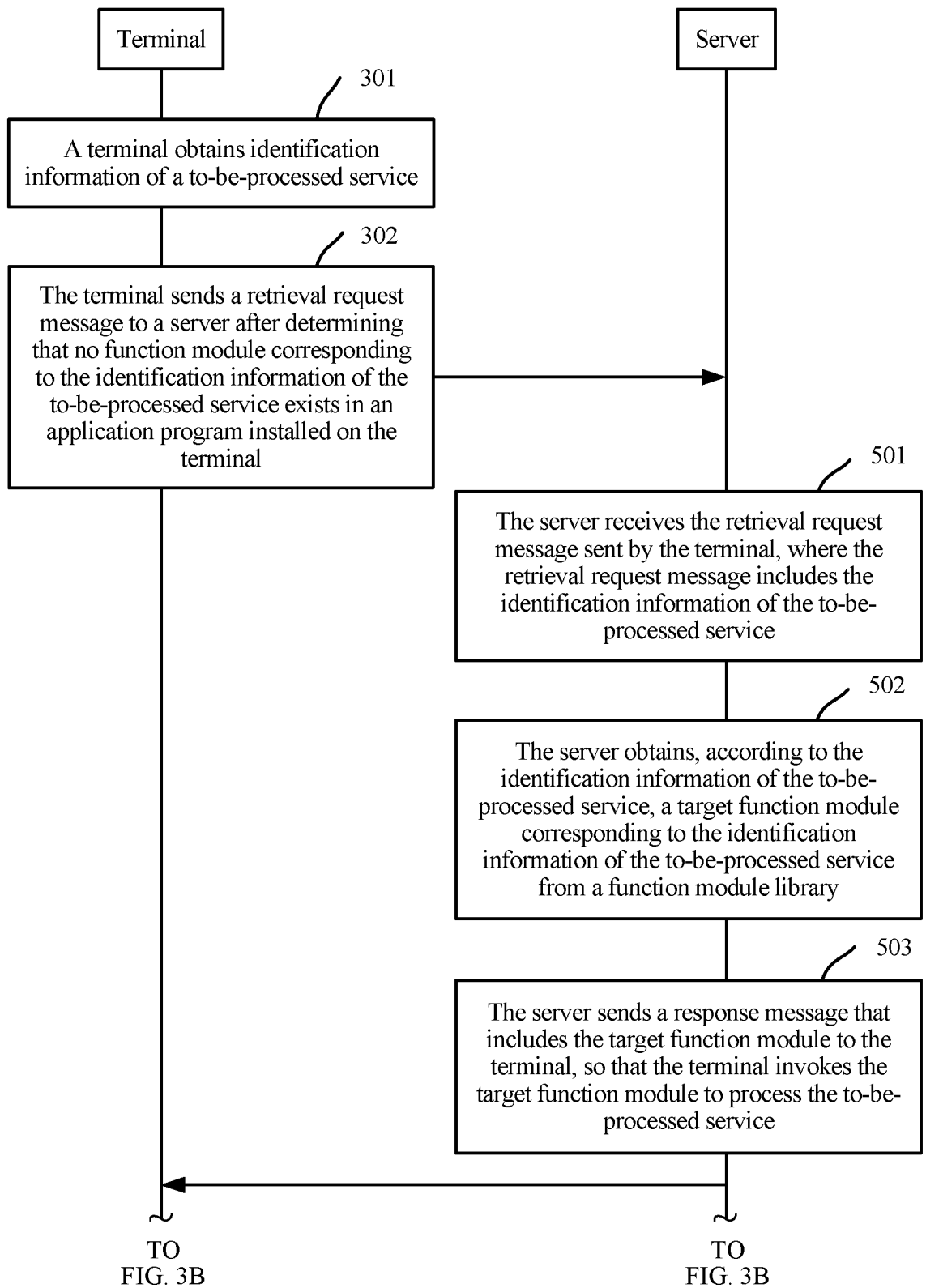
FIG. 3A and FIG. 3B are a schematic flowchart corresponding to a service processing method according to an embodiment of the present invention.
Figure 3B:
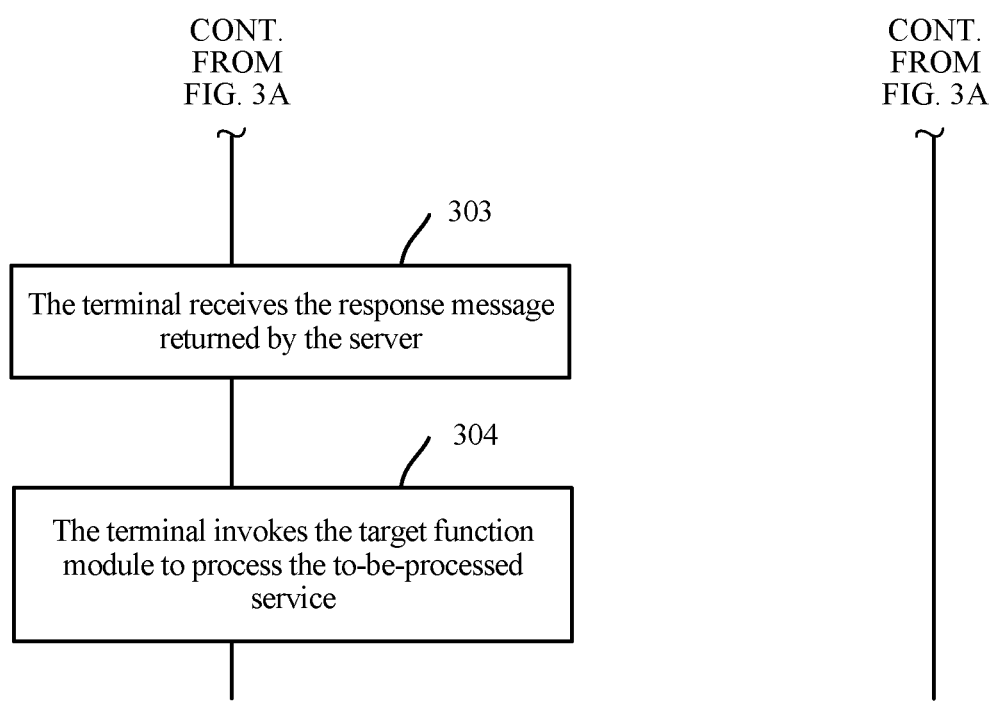

The memory 120 may be configured to store an instruction and data. The memory 120 may mainly include an instruction storage area and a data storage area. The data storage area may store an association relationship between a joint touch gesture and an application program function. The instruction storage area may store an operating system, an instruction required by at least one function, and the like. The instruction may be used by the processor 190 to execute the following method. A specific method is shown in FIG. 3A and FIG. 3B.

The processor 190 is a control center of the terminal 101, is connected to all parts of the entire terminal by using various interfaces and lines, and performs various functions and data processing of the terminal 101 by running or executing the instruction stored in the memory 120 and by invoking the data stored in the memory 120, so as to perform overall monitoring on the terminal. Optionally, the processor 190 may include one or more processing units. Preferably, an application processor and a modem processor may be integrated into the processor 190. The application processor mainly processes an operating system, a user interface, an application program, and the like. The modem processor mainly processes wireless communication. It may be understood that the modem processor may not be integrated into the processor 190. In some embodiments, the processor and the memory may be implemented in a single chip, or in some embodiments, the processor and the memory may be separately implemented in independent chips.

The radio frequency unit 110 may be configured to: receive and send information, or receive and send a signal in a call process; after receiving downlink information of a base station, send the downlink information to the processor 190 for processing; and send related uplink data to the base station. Generally, the RF circuit includes but is not limited to an antenna, at least one amplifier, a transceiver, a coupler, a low noise amplifier (Low Noise Amplifier, LNA), and a duplexer. In addition, the radio frequency unit 110 may further communicate with a network device and another device by means of wireless communication. Any communications standard or protocol may be used for the wireless communication, and includes but is not limited to the Global System for Mobile Communications (Global System of Mobile communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an email, or a short message service (Short Messaging Service, SMS).

The audio frequency circuit 160, the loudspeaker 161, and the microphone 162 may provide an audio frequency interface between the user and the terminal 101. The audio frequency circuit 160 may transmit an electrical signal converted from received audio frequency data to the loudspeaker 161, and the loudspeaker 161 converts the electrical signal into a sound signal for output. In addition, the microphone 162 converts a collected sound signal into an electrical signal, the audio frequency circuit 160 receives the electrical signal, converts the electrical signal into audio frequency data, and then outputs the audio frequency data to the processor 190 for processing. Then, the processor 190 sends the audio frequency data to, for example, another terminal by using the radio frequency unit 110, or outputs the audio frequency data to the memory 120 for further processing (for example, converting the audio frequency data into text information). The audio frequency circuit may also include an earphone jack 163, configured to provide a connection interface between the audio frequency circuit and an earphone.

WiFi is a short-distance wireless transmission technology. The terminal 101 may help, by using the WiFi module 170, the user receive and send an email, browse a web page, communicate with a server, and the like. The WiFi module 170 provides wireless broadband Internet access for the user. Although the WiFi module 170 is shown in FIG. 2, it may be understood that the WiFi module 170 is not a mandatory component of the terminal 101, and may be omitted according to a requirement provided that the essence of the present invention is not changed.

The terminal 101 further includes the power supply 180 (such as a battery) that supplies power to each component. Preferably, the power supply 180 may be logically connected to the processor 190 by using a power management system, so as to implement functions such as charging, discharging, and power consumption management by using the power management system.

The terminal 101 further includes the external interface 191. The external interface may be a standard micro USB interface, or may be a multi-pin connector. The external interface may be configured to connect the terminal 101 to another apparatus for communication, or may also be configured to connect to a charger for charging the terminal 101.

The terminal 101 may further include a camera, a flashlight, and the like although they are not shown, and details are not described herein.

The server in this embodiment of the present invention may be a device that has permission to access a function module library. The function module library includes one or more function modules. Specifically, the function module includes the following elements:

(1) Attribute information: The attribute information is used to describe, by using a label, a key-value (Key-Value) pair, a text, and the like, a service provided by the function module, and is used for retrieval by the server.

(2) Service logic: Each function module is used to implement a specific service function, and the service logic implements the specific service function by using software (that may cooperate with hardware). In addition to the software, the service logic may include data required by a service. The data may be from a terminal, or may be from the server, or may be from a third-party data source.

(3) Human-computer interaction interface: The human-computer interaction interface is used to receive input from a user, and feed back a running result to the user. One function module may have one or more human-computer interaction interfaces.

(4) Loading interface: When the terminal generates an application program, the loading interface is an entry for mounting a function module onto the application program, and when the function module in the application program is started, the loading interface may be used as a starting entry of the function module. For example, the loading interface may describe an interface name, an interface parameter, an icon, a name of the function module, and the like by using an XML document.

In this embodiment of the present invention, the function module may further include, according to different execution environments of an application program on the terminal, another element required by the execution environments.

The function module may be implemented in multiple forms, for example, in a form of source code (code of a web application is the source code), in a form of intermediate code, or in a form of terminal native machine code. Different implementation forms require the terminal to provide different execution environments. For example, the form of the source code (HTML, JaveScrpt, or CSS) of the web application requires the terminal to include a browser engine for parsing and executing the function module; the intermediate code requires a virtual machine, that has the intermediate code, in the terminal to parse and execute the function module; or the form of the terminal native machine code requires an operating system in the terminal to provide support. After the function module is sent by the server to the terminal, the function module is combined into the application program on the terminal, so that a subsequent function can be implemented.

In this embodiment of the present invention, the application program is re-defined, and the application program is a program framework without a service processing function. The function module is mounted onto the application program by using the loading interface of the function module. For example, the loading interface may describe the interface name, the interface parameter, the icon, and the name of the function module, and the like by using the XML document. The function module is mounted onto the application program in at least the following three forms. In a first implementation, content described in the XML document accords with a rule accepted by both parties, that is, a developer of the function module and a developer of the application program comply with a criterion or a rule in advance, and by default, the function module can be mounted onto the application program provided that the application program and the function module accept the criterion or the rule. After reading the rule, the application program performs standardization processing according to a related stipulation in the rule. The function module is mounted on the premise that a framework of the application program is not changed and another function module in the application program is not affected. In a second implementation, a detailed interface name, interface parameter, and the like are mandatorily pre-defined, to implement standardization of the interface name, the interface parameter, and the like. After reading the standard interface name, the standard interface parameter, and the like in the XML document, the application program determines a subsequent mounting procedure, so that the function module is mounted onto the application program. In a third implementation, there is no negotiation between a developer of the application program and a developer of the function module, and no organization defines a standard mounting rule. Therefore, after reading the XML document, the application program performs an updating procedure of the application program, for example, adaptively adjusts an architecture of the entire application program or obtains rights of the developer so as to adjust an architecture of the application program, so that the function module is mounted onto the application program. In the foregoing three implementations, the first implementation has highest efficiency and makes fewest changes to existing application program development and function module development.

The application program has the following basic features:

(1) Attribute information: The attribute information is used to describe a feature of a function module mounted onto the application program, so that a function module that matches the application program is determined. The attribute information of the application program originates from attribute information of the function module, that is, attribute information of multiple function modules that have an association relationship may be classified into a category according to the attribute information of the function module, the attribute information of the multiple function modules may be determined as attribute information of one application program, and subsequently, the multiple function modules may be mounted onto the application program.

(2) Starting entry: The starting entry may be, for example, an icon, a call interface interconnected to a voice instruction, or a call interface interconnected to a retrieval condition construction module.

(3) Blank window displayed after startup: If no function module is mounted onto the application program, a blank window is displayed; or if a function module is mounted onto the application program, an icon of each mounted function module is displayed.

(4) Call interface paired with a loading interface of a function module: The application program invokes the function module by using the interface.

That is, the application program in this embodiment of the present invention is a "shell", and has no service function after being installed. The application program has a service function only after one or more function modules are mounted onto the application program. For example, an application program whose attribute information is an entertainment activity is installed on the terminal, a starting entry of the application program is an icon, and the application program has no service processing function. If multiple entertainment activity function modules such as movie and shopping are mounted onto the application program, a corresponding function module is subsequently invoked, according to a specific requirement of a user, to process a service function. For example, if the user wants to watch a movie, the user taps an icon of this application program on an interaction interface, so that an icon of the function module movie is displayed to the user, and further, a corresponding service is processed according to a requirement of the user. Based on the system architecture shown in FIG. 1, FIG. 3A and FIG. 3B show a service processing method that may be executed by a terminal according to an embodiment of the present invention. The entity terminal for executing the method may be the terminal 101 in FIG. 2. Specifically, the processor 190 in the terminal 101 reads a program stored in the memory 120, and is configured to execute the following method procedure with the help of the input unit 130, the display unit 140, and the sensor unit 150. The method includes the following steps.

Step 301: The terminal obtains identification information of a to-be-processed service.

Step 302: The terminal sends a retrieval request message to a server after determining that no function module corresponding to the identification information of the to-be-processed service exists in an application program installed on the terminal, where the retrieval request message includes the identification information of the to-be-processed service.

Step 303: The terminal receives a response message returned by the server, where the response message includes a target function module corresponding to the identification information of the to-be-processed service.

Step 304: The terminal invokes the target function module to process the to-be-processed service.

In this embodiment of the present invention, after obtaining the identification information of the to-be-processed service, the terminal first determines whether a function module corresponding to the to-be-processed service exists in the installed application program, and sends the retrieval request message to the server only when no function module corresponding to the to-be-processed service exists in the installed application program, so that the terminal does not need to obtain a web application from the server each time. In addition, the terminal receives the target function module returned by the server, instead of an application program installation package (that may include content unrelated to a functional requirement this time), so that traffic and a download time are effectively reduced. Because the target function module is highly pertinent, in this way, use efficiency of the application program is dramatically increased while processing the to-be-processed service is completed.

In this embodiment of the present invention, the to-be-processed service may be a service initiated by a user by using input information, or a service triggered by data information detected by a sensor. The input information of the user is usually not an accurate and complete service name or specific function description. Therefore, a keyword needs to be determined according to the input information of the user, and the keyword is used as identification information of the service initiated by the user by using the input information. Likewise, a keyword may be determined according to the data information detected by the sensor, and the keyword is used as identification information of the service triggered by the data information. That is, in this embodiment of the present invention, the identification information of the to-be-processed service is one or more keywords.

Specifically, the terminal may obtain the identification information of the to-be-processed service from received input information of the user in real time in step 301, and perform step 302 to step 304. The input information of the user may be information entered by the user in a text form. The terminal performs processing such as word segmentation, stop word removal, syntax analysis, and semantic analysis on a text entered by the user; extracts a keyword from the text entered by the user, or properly expands the entered text to generate a keyword; and uses the obtained keyword as the identification information of the to-be-processed service. The input information of the user may be information entered in a voice form. The terminal first converts voice information into text information, then determines a keyword in the foregoing manner, and uses the keyword as the identification information of the to-be-processed service. For example, if information entered by the user in a text form is a text "I want to order", the input information is extracted to determine a keyword "order", so that "order" can be determined as the identification information of the to-be-processed service. Accordingly, the to-be-processed service is an order service.

The terminal may also obtain the identification information of the to-be-processed service according to obtained information about the sensor, and the information about the sensor includes data information collected by the sensor and a function attribute of the sensor. After determining that the data information does not meet a normal preset condition corresponding to the function attribute, the terminal obtains the identification information of the to-be-processed service, and performs step 302 to step 304. In this case, the identification information of the to-be-processed service includes two parts: a first keyword corresponding to the data information collected by the sensor, and at least one preset second keyword corresponding to the function attribute of the sensor. The following separately describes determining of the first keyword and the second keyword.

(1) First Keyword

Data information collected by a sensor may be classified into two categories: data information that meets a normal preset condition, and data information that does not meet the normal preset condition. The normal preset condition may be empirically set by persons skilled in the art. Sensors with different function attributes are corresponding to different normal preset conditions. For example, if a function attribute of a sensor is blood pressure detection, it may be set that a normal preset condition is that a systolic blood pressure is greater than or equal to 90 and is less than or equal to 140, and a diastolic blood pressure is greater than or equal to 60 and is less than or equal to 90. If the data information collected by the sensor meets the normal preset condition, that is, is in a normal state, in this case, the terminal does not need to process a service, and does not need to send a retrieval request message to the server to obtain a function module, either, or if the data information collected by the sensor does not meet the normal preset condition, that is, is in an abnormal state, in this case, the terminal needs to process a service, that is, needs to perform step 302 to step 304.

For sensors with different function attributes, after collected data information does not meet a normal preset condition, a value range to which the data information belongs may be further determined, and a keyword corresponding to value range may be used as the first keyword. A correspondence between value ranges of the sensors with different function attributes and keywords is preset. In this embodiment of the present invention, the preset correspondence may be stored in the terminal, for example, stored in a first data table in a data table form. The sensor whose function attribute is blood pressure detection is used as an example. A value range indicating that a systolic blood pressure is greater than or equal to 140 and a diastolic blood pressure is greater than or equal to 90 is corresponding to a keyword "hypertension", a value range indicating that a systolic blood pressure is less than 90 is corresponding to a keyword "hypotension", and a value range indicating that a diastolic blood pressure is less than 60 is corresponding to the keyword "hypotension".

In this embodiment of the present invention, to avoid an error existing in data collected by the sensor, the terminal may obtain data information collected by the sensor for multiple times within a set duration range, and determine the first keyword according to analysis of the accumulated data information of multiple times. For example, if at least half of the data information collected for multiple times is corresponding to a same keyword, the keyword may be determined as the first keyword.

(2) Second Keyword

In this embodiment of the present invention, different function attributes of a sensor are corresponding to different keywords. For example, if a function attribute is blood pressure detection, corresponding keywords are "blood pressure, cardiovascular, cerebrovascular, and the like". A correspondence between a function attribute and a keyword is preset. In this embodiment of the present invention, the preset correspondence may be stored in the terminal, for example, stored in a second data table in a data table form, so that after a function attribute of the sensor is obtained, a keyword corresponding to the function attribute can be obtained by performing query in the second data table. The function attribute may be corresponding to one or more keywords. In this embodiment of the present invention, at least one keyword in the keywords corresponding to the function attribute may be used as the second keyword. Preferably, to select complete and specific keywords, all the keywords corresponding to the function attribute may be used as second keywords.

After the first keyword and the at least one second keyword are determined in the foregoing manner, the first keyword and the at least one second keyword may be used as the identification information of the to-be-processed service. For example, the sensor whose function attribute is blood pressure detection collects data information: A systolic blood pressure is 150, and a diastolic blood pressure is 95. A value range with which the data information accords is corresponding to a keyword "hypertension" (the first keyword), the function attribute (blood pressure detection) is corresponding to second keywords "blood pressure, cardiovascular, and cerebrovascular". Therefore, it may be learned that the identification information of the to-be-processed service is "hypertension, blood pressure, cardiovascular, and cerebrovascular".

Figure 4:
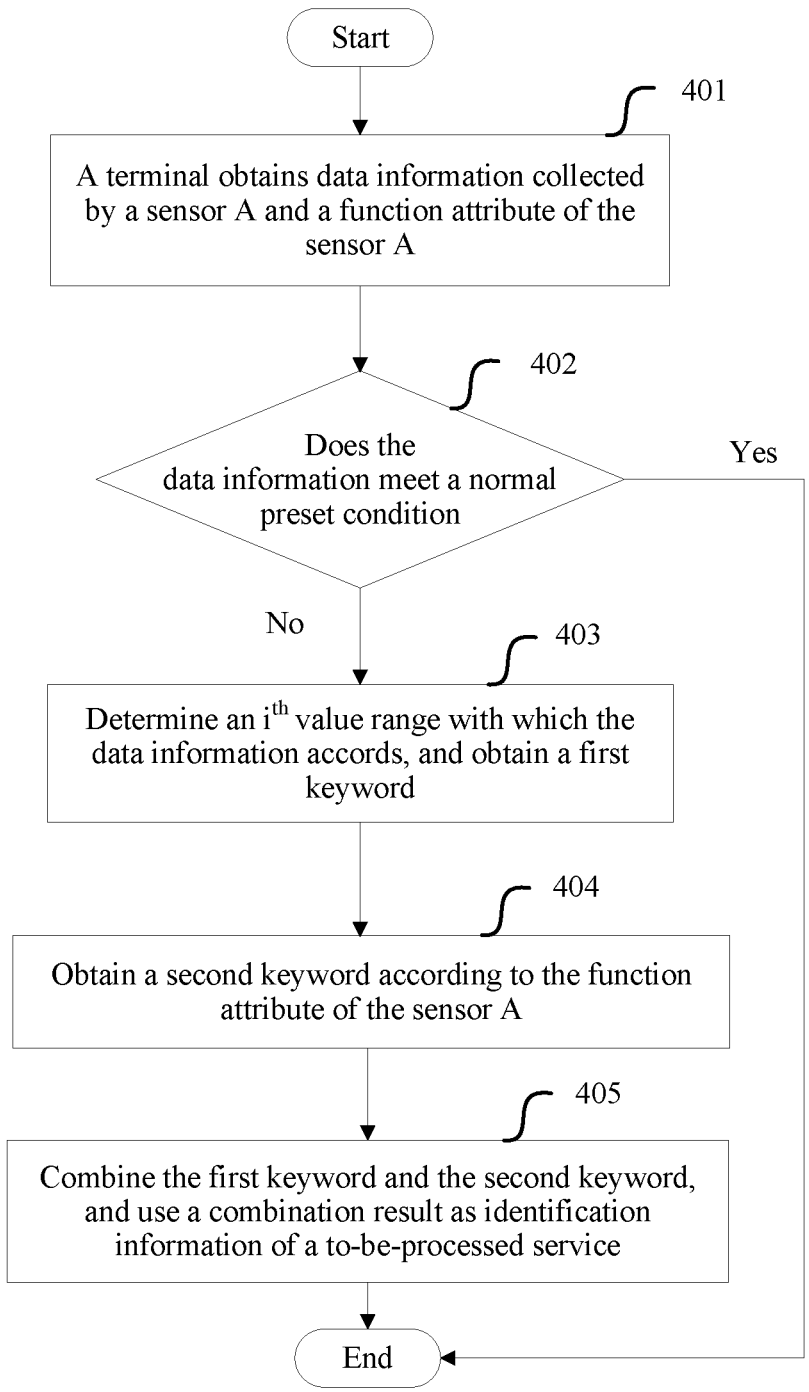
FIG. 4 is a schematic flowchart of determining identification information of a to-be-processed service according to information about a sensor A.

The following provides detailed descriptions of the foregoing process in the embodiments of the present invention by using an example in which identification information of a to-be-processed service is determined according to information about a sensor (for example, a sensor A). As shown in FIG. 4, FIG. 4 is a schematic flowchart of determining the identification information of the to-be-processed service according to the information about the sensor A.

Step 401: A terminal obtains data information collected by the sensor A and a function attribute of the sensor A. Details may be as follows: After collecting the data information, the sensor A sends the data information and the function attribute of the sensor A to the terminal; or the sensor A sends only the collected data information, and the function attribute of the sensor A is preconfigured on the terminal.

Step 402: The terminal determines, according to the function attribute of the sensor A, whether the data information meets a normal preset condition corresponding to the function attribute of the sensor A; and if the data information meets the normal preset condition, directly ends the procedure, or if the data information does not meet the normal preset condition, performs step 403.

Step 403: Determine a value range with which the data information accords. Details may be as follows: The data information is compared with a first value range, if the data information does not accord with the first value range, the data information is compared with a second value range, . . . , and so on, until an $i^{th}$ value range with which the information accords is determined; and a first data table is searched to obtain a keyword corresponding to the $i^{th}$ value range, that is, a first keyword.

Step 404: Search a second data table to obtain a keyword corresponding to the function attribute of the sensor A, so that a second keyword can be obtained.

Step 405: Combine the first keyword and the second keyword, and use a combination result as identification information of a to-be-processed service.

It should be noted that the foregoing procedure is only an implementation. An order of obtaining the first keyword and the second keyword is not specifically limited in this embodiment of the present invention. That is, the second keyword may be obtained before the first keyword is obtained, or the first keyword and the second keyword may be simultaneously obtained, or after the function attribute of the sensor is obtained, the second data table may be directly searched to obtain the second keyword. In step 402, after it is determined that the data information meets the normal preset condition corresponding to the function attribute of the sensor A, the procedure ends. Therefore, in this embodiment of the present invention, preferably, a step of obtaining the first keyword and the second keyword is performed after it is determined that the data information does not meet the normal preset condition corresponding to the function attribute of the sensor A, so that processing resources can be effectively reduced by properly arranging an execution order, and the following case is avoided: Because the data information meets the normal preset condition, the determined second keyword is invalid.

In this embodiment of the present invention, in step 302, after obtaining the identification information of the to-be-processed service, the terminal compares the identification information of the to-be-processed service with attribute information of a function module in the application program installed on the terminal, to determine whether a function module corresponding to the identification information of the to-be-processed service locally exists. The function module corresponding to the identification information of the to-be-processed service is a function module that matches the identification information of the to-be-processed service. In this embodiment of the present invention, a corresponding or matching criterion may be empirically set by persons skilled in the art. For example, if similarity between attribute information of a function module and the identification information of the to-be-processed service is greater than or equal to a first threshold, the function module is a function module corresponding to the to-be-processed service. The first threshold is empirically set by persons skilled in the art. For example, if attribute information of a function module is "provide an order service for a user", and the identification information of the to-be-processed service is "order", it is learned, by means of comparison, that the attribute information of the function module totally includes the identification information of the to-be-processed service. In this case, it may be determined that similarity between the attribute information of the function module and the identification information of the to-be-processed service is 100%, and the function module is a function module corresponding to the identification information of the to-be-processed service. In this embodiment of the present invention, there may be multiple manners of determining similarity. A manner may be specifically selected and determined by persons skilled in the art, and is not limited to the foregoing examples.

If it is determined that a function module corresponding to the to-be-processed service locally exists, the terminal directly invokes the function module to process the to-beprocessed service; or if no function module corresponding to the to-be-processed service locally exists, the terminal needs to obtain the target function module from the server. The target function module is a function module corresponding to the to-be-processed service. Specifically, the terminal sends, to the server, the retrieval request message that carries the identification information of the to-be-processed service. Accordingly, the server performs step 501 to step 503 in FIG. 3A.

Step 501: The server receives the retrieval request message sent by the terminal, where the retrieval request message includes the identification information of the to-be-processed service.

Step 502: The server obtains, according to the identification information of the to-be-processed service, a target function module corresponding to the identification information of the to-be-processed service from a function module library.

Step 503: The server sends a response message that includes the target function module to the terminal, so that the terminal invokes the target function module to process the to-be-processed service.

The server receives the retrieval request message sent by the terminal, and the retrieval request message is sent after the terminal determines that no function module corresponding to the identification information of the to-be-processed service exists in the application program installed on the terminal. The server obtains, according to the identification information that is of the to-be-processed service and that is in the retrieval request message, the target function module corresponding to the identification information of the to-be-processed service from the function module library, and sends the response message that includes the target function module to the terminal, so that the terminal invokes the target function module to process the to-be-processed service. In this embodiment of the present invention, the terminal first determines whether a function module corresponding to the to-be-processed service exists in the installed application program, and sends the retrieval request message to the server only when no function module corresponding to the to-be-processed service exists in the installed application program, so that the terminal does not need to obtain a web application from the server each time. In addition, the server returns the target function module to the terminal, instead of an application program installation package (that may include content unrelated to a functional requirement this time), so that traffic and a download time of the terminal are effectively reduced. Because the target function module is highly pertinent, in this way, use efficiency of the application program is dramatically increased while processing the to-be-processed service is completed.

In step 501, the server may communicate with the terminal by using a WLAN, a cellular network, or a wired network. After receiving the retrieval request message sent by the terminal, the server obtains the identification information of the to-be-processed service from the retrieval request message.

In step 502, the server accesses the function module library, and compares the identification information of the to-be-processed service with attribute information of each function module in the function module library, to obtain similarity between the identification information of the to-be-processed service and the attribute information of each function module in the function module library. A specific similarity algorithm may be set by persons skilled in the art. For example, similarity may be determined according to similarity between keywords included in the identification information of the to-be-processed service and the attribute information of each function module. The server determines a function module whose attribute information has highest similarity to the identification information of the to-be-processed service as the target function module according to the determined similarity. Likewise, in the foregoing solution, when it is determined whether the target function module matches an application program, similarity between attribute information of the target function module and attribute information of the application program may be used as a reference, and when the similarity reaches a preset threshold, it is determined that the target function module matches the application program, and the target function module is added to the matched application program.

In step 503, after determining the target function module from the function module library, the server may directly send the response message that includes the target function module to the terminal. In this case, the server only needs to send one response message, or the server may send two response messages, that is, first send the terminal one response message used to notify the terminal that the target function module is determined from the function module library, and then send one response message that includes the target function module to the terminal.

In step 303 and step 304, the terminal receives the response message returned by the server, and the response message includes the target function module and the attribute information of the target function module. The terminal determines, according to the attribute information of the target function module, whether an installed application program matches the target function module. As described above, the application program in this embodiment of the present invention has no service function, and can have a service function only after one or more function modules are mounted onto the application program.

Figure 5:
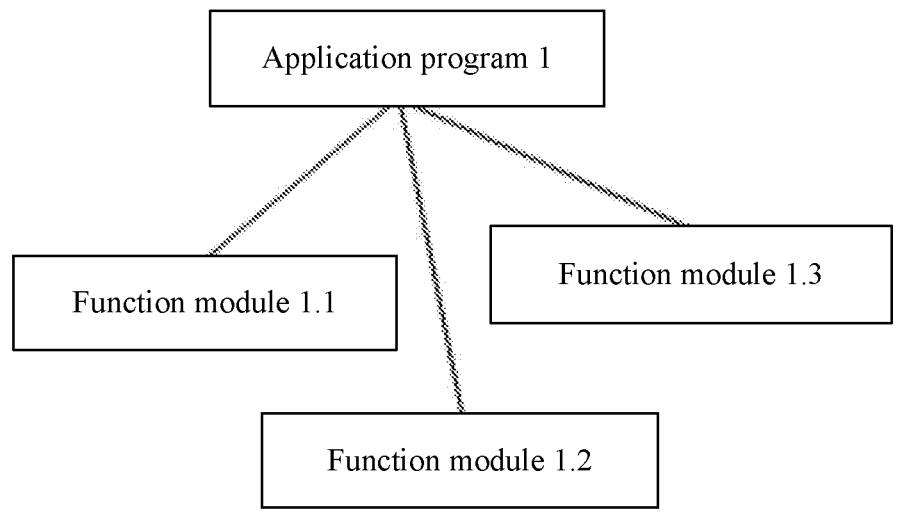
FIG. 5 is a schematic diagram of mounting a function module onto an application program.

FIG. 5 is a schematic diagram of mounting a function module onto an application program. As shown in FIG. 5, function modules mounted onto an application program 1 include a function module 1.1, a function module 1.2, and a function module 1.3.

In this embodiment of the present invention, a criterion for matching between an installed application program and a target function module may be: A terminal compares attribute information of the installed application program with attribute information of the function module, to obtain a degree of association between the attribute information of the installed application program and the attribute information of the function module, and uses an application program whose association degree is greater than or equal to a second threshold as an application program that matches the target function module. If an application program that matches the target function module exists, the target function module may be directly mounted onto the application program; or if no application program that matches the target function module exists, a new application program is created and installed, and the target function module is added to the newly installed application program. Specifically, the new application program created by the terminal may be referred to as a shell program, and the shell program is similar to an app in an existing Android system. A management program on the terminal creates the shell program, for example, creates the shell program by copying pseudocode, and then mounts a function module onto the shell program. An interface between the shell program and the function module may be a pre-defined standard interface. Then, the terminal invokes the target function module added to the installed or the newly installed application program to process a to-beprocessed service. If the terminal receives a same to-be-processed service again, the terminal may directly obtain the target function module locally to process the to-be-processed service, and does not need to obtain an application program from the server again. Therefore, a cumulative effect is achieved, and a problem that web applications cannot be accumulated on the terminal is avoided. In addition, a corresponding service is downloaded according to a user requirement, so that use efficiency is maximized, and transmission traffic and a time for waiting for installation are reduced.

In this embodiment of the present invention, a specific method for adding the function module to the application program by the terminal is related to packaging and generation of a function segment. The function module is mounted onto the application program by means of description of a loading interface of the function module. To make a conventional manner of tapping an icon to execute an application program compatible, an icon provided by the loading interface is used, and an icon corresponding to the function module is added to a user interface of the application program. When a user taps the icon, the function module is executed. Subsequently, if there is a new human-computer interaction manner, for example, the function module is started and invoked by using a voice or by means of photographing, a corresponding application programming interface (API) may be used as an execution entry of the function module.

Each time the terminal mounts a function module onto an application program, the terminal sets an execution entry for the function module mounted onto the application program, for example, sets an icon or an interface interconnected to a retrieval interface or a voice input interface. Each function module is mounted onto an application program in a software form, and an internal service logic in the function module may interact with another host by using a local hardware module of the terminal or by using a network.

Figure 6:
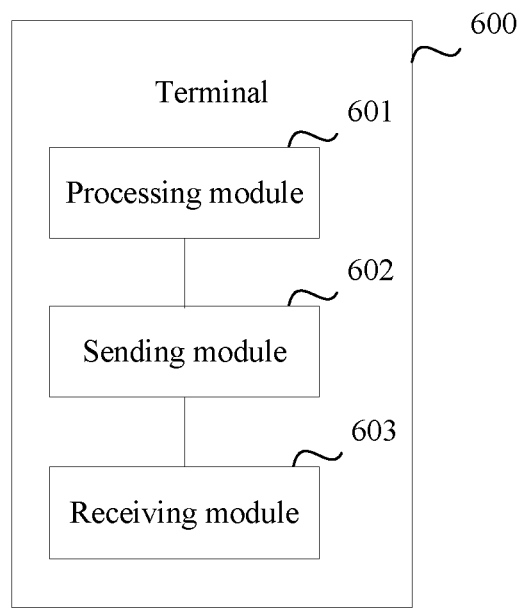
FIG. 6 is a schematic structural diagram of a service processing terminal according to an embodiment of the present invention.

FIG. 6 shows an example of a schematic structural diagram of a service processing terminal according to an embodiment of the present invention.

Based on a same concept, this embodiment of the present invention provides a service processing terminal 600, configured to execute the embodiment of the foregoing service processing method. As shown in FIG. 6, the terminal 600 includes a processing module 601, a sending module 602, and a receiving module 603.

The processing module 601 is configured to: obtain identification information of a to-be-processed service, and determine whether a function module corresponding to the identification information of the to-be-processed service exists in an application program installed on the terminal.

The sending module 602 is configured to send a retrieval request message to a server after the processing module determines that no function module corresponding to the identification information of the to-be-processed service exists in the application program installed on the terminal, where the retrieval request message includes the identification information of the to-be-processed service.

The receiving module 603 is configured to receive a response message returned by the server, where the response message includes a target function module corresponding to the identification information of the to-be-processed service. The processing module 601 is further configured to invoke the target function module to process the to-be-processed service.

Optionally, the processing module 601 is further configured to:

after determining that a function module corresponding to the identification information of the to-be-processed service exists in the installed application program, invoke the function module corresponding to the identification information of the to-be-processed service to process the to-be-processed service.

Optionally, after the receiving module 603 receives the response message returned by the server, before the processing module 601 invokes the target function module to process the to-be-processed service, the processing module 601 is further configured to:

if an application program that matches the target function module exists in the installed application program, add the target function module to the matched application program; and invoke the target function module added to the installed application program, to process the to-be-processed service.

Optionally, after the receiving module 603 receives the response message returned by the server, before the processing module 601 invokes the target function module to process the to-be-processed service, the processing module 601 is further configured to:

if no application program that matches the target function module exists in the installed application program, install a new application program, and add the target function module to the newly installed application program; and invoke the target function module added to the newly installed application program to process the to-be-processed service.

Optionally, the receiving module 603 is further configured to receive input information of a user.

The processing module 601 is specifically configured to obtain the identification information of the to-be-processed service from the input information.

Optionally, the processing module 601 is specifically configured to: obtain information about a sensor, and obtain the identification information of the to-be-processed service according to the information about the sensor.

Optionally, the processing module 601 is specifically configured to:

obtain data information collected by the sensor and a function attribute of the sensor;

after it is determined, according to the function attribute of the sensor, that the data information does not meet a normal preset condition corresponding to the function attribute, obtain a first keyword corresponding to the data information and at least one preset second keyword corresponding to the function attribute of the sensor; and use the first keyword and the at least one second keyword as the identification information of the to-be-processed service.

Optionally, the data information includes data collected by the sensor at different moments.

It may be learned from the foregoing content that, in this embodiment of the present invention, the terminal obtains the identification information of the to-be-processed service, and sends the retrieval request message to the server after determining that no function module corresponding to the identification information of the to-be-processed service exists in the application program installed on the terminal. The terminal receives the target function module returned by the server, and invokes the target function module to process the to-be-processed service. In this embodiment of the present invention, the terminal first determines whether a function module corresponding to the to-be-processed service exists in the installed application program, and sends the retrieval request message to the server only when no function module corresponding to the to-be-processed service exists in the installed application program, so that the terminal does not need to obtain a web application from the server each time. In addition, the terminal receives the target function module returned by the server, instead of an application program installation package (that may include content unrelated to a functional requirement this time), so that traffic and a download time are effectively reduced. Because the target function module is highly pertinent, in this way, use efficiency of the application program is dramatically increased while processing the to-be-processed service is completed.

Figure 7:
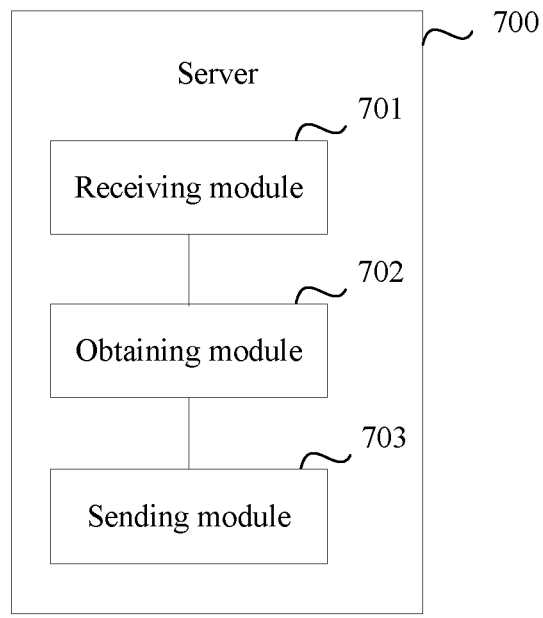
FIG. 7 is a schematic structural diagram of a service processing server according to an embodiment of the present invention.

FIG. 7 shows an example of a schematic structural diagram of a service processing server according to an embodiment of the present invention.

Based on a same concept, this embodiment of the present invention provides a service processing server 700, configured to execute the embodiment of the foregoing service processing method. As shown in FIG. 7, the server 700 includes a receiving module 701, an obtaining module 702, and a sending module 703.

The receiving module 701 is configured to receive a retrieval request message sent by a terminal, where the retrieval request message is sent after the terminal determines that no function module corresponding to identification information of a to-be-processed service exists in an application program installed on the terminal, and the retrieval request message includes the identification information of the to-be-processed service.

The obtaining module 702 is configured to obtain, according to the identification information of the to-be-processed service, a target function module corresponding to the identification information of the to-be-processed service from a function module library.

The sending module 703 is configured to send a response message that includes the target function module to the terminal, so that the terminal invokes the target function module to process the to-be-processed service.

Optionally, the function module library is located on the server, and the function module library includes one or more function modules.

The obtaining module 702 is specifically configured to:
obtain attribute information of each function module in the function module library;
compare the identification information of the to-be-processed service with the attribute information of each function module in the function module library, to obtain similarity between the identification information of the to-be-processed service and the attribute information of each function module; and
determine a function module corresponding to highest similarity as the target function module.

It may be learned from the foregoing content that, in this embodiment of the present invention, the server receives the retrieval request message sent by the terminal, and the retrieval request message is sent after the terminal determines that no function module corresponding to the identification information of the to-be-processed service exists in the application program installed on the terminal. The server obtains, according to the identification information that is of the to-be-processed service and that is in the retrieval request message, the target function module corresponding to the identification information of the to-be-processed service from the function module library, and sends the response message that includes the target function module to the terminal, so that the terminal invokes the target function module to process the to-be-processed service. In this embodiment of the present invention, the terminal first determines whether a function module corresponding to the to-be-processed service exists in the installed application program, and sends the retrieval request message to the server only when no function module corresponding to the to-be-processed service exists in the installed application program, so that the terminal does not need to obtain a web application from the server each time. In addition, the server returns the target function module to the terminal, instead of an application program installation package (that may include content unrelated to a functional requirement this time), so that traffic and a download time of the terminal are effectively reduced. Because the target function module is highly pertinent, in this way, use efficiency of the application program is dramatically increased while processing the to-be-processed service is completed.

Figure 8:
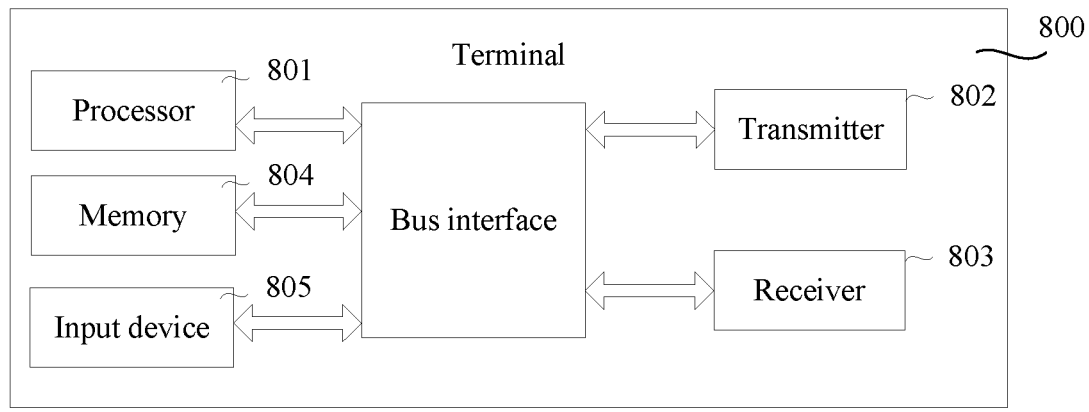
FIG. 8 is a schematic structural diagram of another service processing terminal according to an embodiment of the present invention.

FIG. 8 shows an example of a schematic structural diagram of another service processing terminal according to an embodiment of the present invention.

Based on a same concept, this embodiment of the present invention provides a service processing terminal 800, configured to execute the embodiment of the foregoing service processing method. As shown in FIG. 8, the terminal 800 includes a processor 801, a transmitter 802, and a receiver 803, a memory 804, and an input device 805.

The processor 801 is configured to: obtain identification information of a to-be-processed service, and determine whether a function module corresponding to the identification information of the to-be-processed service exists in an application program installed on the terminal.

The transmitter 802 is configured to send a retrieval request message to a server after the processor determines that no function module corresponding to the identification information of the to-be-processed service exists in the application program installed on the terminal, where the retrieval request message includes the identification information of the to-be-processed service.

The receiver 803 is configured to receive a response message returned by the server, where the response message includes a target function module corresponding to the identification information of the to-be-processed service.

The processor 801 is further configured to invoke the target function module to process the to-be-processed service.

Optionally, the processor 801 is further configured to:
after determining that a function module corresponding to the identification information of the to-be-processed service exists in the installed application program, invoke the function module corresponding to the identification information of the to-be-processed service to process the to-be-processed service.

Optionally, after the receiver 803 receives the response message returned by the server, before the processor 801 invokes the target function module to process the to-be-processed service, the processor 801 is further configured to:
if an application program that matches the target function module exists in the installed application program, add the target function module to the matched application program; and invoke the target function module added to the installed application program, to process the to-be-processed service.

Optionally, after the receiver 803 receives the response message returned by the server, before the processor 801 invokes the target function module to process the to-be-processed service, the processor 801 is further configured to:
if no application program that matches the target function module exists in the installed application program, install a new application program, and add the target function module to the newly installed application program; and invoke the target function module added to the newly installed application program to process the to-be-processed service.

Optionally, the input device 805 is configured to receive input information of a user.

When obtaining the identification information of the to-be-processed service, the processor 801 is specifically configured to obtain the identification information of the to-be-processed service from the input information.

Optionally, when obtaining the identification information of the to-be-processed service, the processor 801 is specifically configured to: obtain information about a sensor, and obtain the identification information of the to-be-processed service according to the information about the sensor.

Optionally, when obtaining the identification information of the to-be-processed service, the processor 801 is specifically configured to:

obtain data information collected by the sensor and a function attribute of the sensor;

after it is determined, according to the function attribute of the sensor, that the data information does not meet a normal preset condition corresponding to the function attribute, obtain a first keyword corresponding to the data information and at least one preset second keyword corresponding to the function attribute of the sensor; and use the first keyword and the at least one second keyword as the identification information of the to-be-processed service.

Optionally, the data information includes data collected by the sensor at different moments.

After obtaining the identification information of the to-be-processed service, the terminal first determines whether a function module corresponding to the to-be-processed service exists in the installed application program, and sends the retrieval request message to the server only when no function module corresponding to the to-be-processed service exists in the installed application program, so that the terminal does not need to obtain a web application from the server each time. In addition, the terminal receives the target function module returned by the server, instead of an application program installation package (that may include content unrelated to a functional requirement this time), so that traffic and a download time are effectively reduced. Because the target function module is highly pertinent, in this way, use efficiency of the application program is dramatically increased while processing the to-be-processed service is completed.

A bus architecture may include any quantity of interconnected buses and bridges, and specifically link together various circuits of one or more processors represented by the processor and a memory represented by the memory. The bus architecture may further link together various other circuits such as a peripheral device, a voltage regulator, and a power management circuit. This is well known in the art, and therefore, is not further described in this specification. A bus interface provides an interface. A transceiver provides a unit for communicating with various other devices on a transmission medium. The processor is responsible for bus architecture management and general processing. The memory may store data used when the processor performs an operation.

Figure 9:
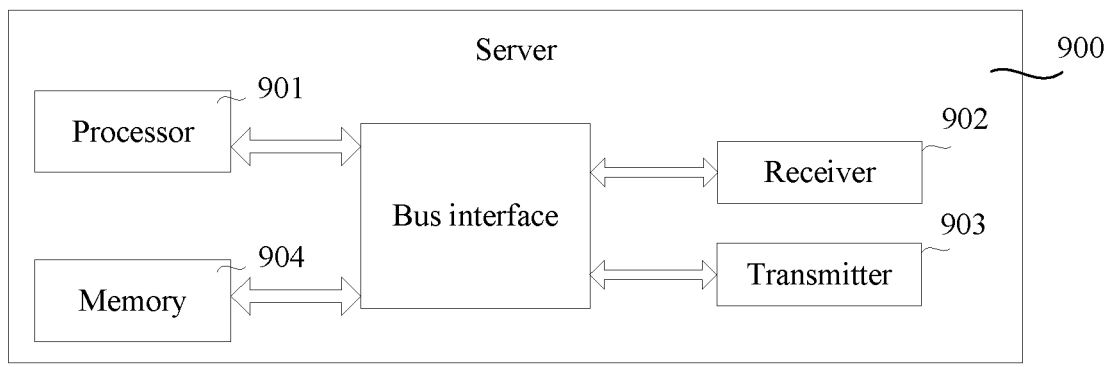
FIG. 9 is a schematic structural diagram of another service processing server according to an embodiment of the present invention.

FIG. 9 shows an example of a schematic structural diagram of a service processing server according to an embodiment of the present invention.

Based on a same concept, this embodiment of the present invention provides a service processing server 900, configured to execute the embodiment of the foregoing service processing method. As shown in FIG. 9, the server 900 includes a processor 901, a receiver 902, a transmitter 903, and a memory 904.

The receiver 902 is configured to receive a retrieval request message sent by a terminal, where the retrieval request message is sent after the terminal determines that no function module corresponding to identification information of a to-be-processed service exists in an application program installed on the terminal, and the retrieval request message includes the identification information of the to-be-processed service.

The processor 901 is configured to obtain, according to the identification information of the to-be-processed service, a target function module corresponding to the identification information of the to-be-processed service from a function module library.

The transmitter 903 is further configured to send a response message that includes the target function module to the terminal, so that the terminal invokes the target function module to process the to-be-processed service.

Optionally, the function module library is located on the server, and the function module library includes one or more function modules.

The processor 901 is specifically configured to:

obtain attribute information of each function module in the function module library;

compare the identification information of the to-be-processed service with the attribute information of each function module in the function module library, to obtain similarity between the identification information of the to-be-processed service and the attribute information of each function module; and determine a function module corresponding to highest similarity as the target function module.

After receiving the retrieval request message that includes the identification information of the to-be-processed service and that is sent by the terminal, the server obtains the target function module corresponding to the identification information of the to-be-processed service from the function module library, and sends the target function module to the terminal. The server sends the target function module to the terminal instead of sending an application program installation package (that may include content unrelated to a functional requirement this time) to the terminal, so that traffic and a download time of the terminal are effectively reduced. Because the target function module is highly pertinent, in this way, use efficiency of the application program is dramatically increased while the terminal completes processing the to-be-processed service.

A bus architecture may include any quantity of interconnected buses and bridges, and specifically link together various circuits of one or more processors represented by the processor and a memory represented by the memory. The bus architecture may further link together various other circuits such as a peripheral device, a voltage regulator, and a power management circuit. This is well known in the art, and therefore, is not further described in this specification. A bus interface provides an interface. A transceiver provides a unit for communicating with various other devices on a transmission medium. The processor is responsible for bus architecture management and general processing. The memory may store data used when the processor performs an operation.

It may be learned from the foregoing content that, in this embodiment of the present invention, the terminal obtains the identification information of the to-be-processed service, and sends the retrieval request message to the server after determining that no function module corresponding to the identification information of the to-be-processed service exists in the application program installed on the terminal. The terminal receives the target function module returned by the server, and invokes the target function module to process the to-be-processed service. In this embodiment of the present invention, the terminal first determines whether a function module corresponding to the to-be-processed service exists in the installed application program, and sends the retrieval request message to the server only when no function module corresponding to the to-be-processed service exists in the installed application program, so that the terminal does not need to obtain a web application from the server each time. In addition, the terminal receives the target function module returned by the server, instead of an application program installation package (that may include content unrelated to a functional requirement this time), so that traffic and a download time are effectively reduced. Because the target function module is highly pertinent, in this way, use efficiency of the application program is dramatically increased while processing the to-be-processed service is completed.

Persons skilled in the art should understand that the embodiments of the present invention may be provided as a method or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, and an optical memory) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by the computer or the processor of any other programmable data processing device generate a device for implementing a specific function in one or more processes in the flowcharts and/or in one or more blocks in the block diagrams.

These computer program instructions may be stored in a computer readable memory that can instruct a computer or any other programmable data processing device to work in a specific manner, so that the instructions stored in the computer readable memory generate an artifact that includes an instruction device. The instruction device implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A service processing method, comprising: installing, by a terminal, a first application program, wherein the first application program comprises a shell application program, and wherein the shell application program does not comprise a function corresponding to a to-be-processed service; obtaining, by the terminal, identification information of the to-be-processed service, wherein the to-be-processed service is associated with and implemented by the first application program that is installed on the terminal, and wherein the identification information is obtained by: obtaining, by the terminal, information about a sensor; and obtaining, by the terminal, the identification information of the to-be-processed service according to the information about the sensor, wherein the information about the sensor comprises data information collected by the sensor and a function attribute of the sensor, and wherein obtaining the information about the sensor and obtaining the identification information of the to-be-processed service according to the information about the sensor comprises: determining, according to the function attribute of the sensor, that the data information does not satisfy a normal preset condition corresponding to the function attribute; obtaining, by the terminal, a first keyword corresponding to the data information and at least one preset second keyword corresponding to the function attribute of the sensor based on the data information not satisfying the normal preset condition; and setting, by the terminal, the first keyword and the at least one preset second keyword as the identification information of the to-be-processed service; determining, by the terminal, that the first application program that is installed on the terminal and that is configured to cause the terminal to display a blank window responsive to startup of the first application program does not include the function corresponding to the identification information of the to-be-processed service; sending, by the terminal, a retrieval request message to a server when the first application program does not include the function, wherein the first application program comprises a program framework without any service processing functions, and wherein the retrieval request message comprises the identification information of the to-be-processed service; receiving, by the terminal, a response message from the server, wherein the response message comprises the function corresponding to the identification information of the to-be-processed service, wherein the function comprises attribute information, service logic, a human- computer interaction interface, and a loading interface, and wherein the response message does not comprise an application installation package; mounting, by the terminal using the loading interface from the response message, the function to the shell application program that was previously installed on the terminal to provide a modified first application program that includes at least one service function; displaying, by the terminal responsive to startup of the modified first application program, an icon corresponding to the function instead of the blank window when determining that the modified first application program has the at least one service function installed; and invoking, by the terminal using the modified first application program, the function to process the to-be-processed service.

2. The service processing method of claim 1, wherein the data information comprises data collected by the sensor at different moments.

3. The service processing method of claim 1, wherein the terminal invokes the function without receiving an application program from the server.

4. The service processing method of claim 1, furthercomprising displaying a window with the icon corresponding to the function by starting the modified first application program.

5. The service processing method of claim 4, further comprising displaying a second icon corresponding to the modified first application program.

6. A terminal, comprising: a processor configured to: install a first application program, wherein the first application program comprises a shell application program, and wherein the shell application program does not comprise a function corresponding to a to-be-processed service; obtain identification information of the to-be-processed service, wherein the to- be-processed service is associated with and implemented by the first application program that is installed on the terminal, and wherein the identification information is obtained by: obtaining, by the terminal, information about a sensor; and obtaining, by the terminal, the identification information of the to-be- processed service according to the information about the sensor, wherein the information about the sensor comprises data information collected by the sensor and a function attribute of the sensor, and wherein obtainingthe information about the sensor and obtainingthe identification information of the to-be-processed service according to the information about the sensor comprises: determining, according to the function attribute of the sensor, that the data information does not satisfy a normal preset condition corresponding to the function attribute obtaining, by the terminal, a first keyword corresponding to the data information and at least one preset second keyword corresponding to the function attribute of the sensor based on the data information not satisfying the normal preset condition; and setting, by the terminal, the first keyword and the at least one preset second keyword as the identification information of the to-be- processed service; and determine that the first application program that is installed on the terminal and that is configured to cause the terminal to display a blank window responsive to startup of the first application program does not include the function corresponding to the identification information of the to-be-processed service; a transmitter coupled to the processor and configured to send a retrieval request message to a server when the first application program does not include the function, wherein the first application program comprises a program framework without any service processing functions, and wherein the retrieval request message comprises the identification information of the to-be-processed service; and a receiver coupled to the processor and the transmitter and configured to receive a response message from the server, wherein the response message comprises the function corresponding to the identification information of the to-be-processed service, wherein the function comprises attribute information, service logic, a human-computer interaction interface, and a loading interface, and wherein the response message does not comprise an application installation package, wherein the processor is further configured to: mount, usingthe loading interface from the response message, the function to the shell application program that was previously installed on the terminal to provide a modified first application program that includes at least one service function; display, by the terminal responsive to startup of the modified first application program, an icon corresponding to the function instead of the blank window when determining that the modified first application program has the at least one service function installed; and invoke, usingthe modified first application program, the function to process the to-be-processed service.

7. The terminal of claim 6 wherein the data information comprises data collected by the sensor at different moments.

8. The terminal of claim 6, wherein the function includes multiple interfaces including the loading interface and the human-computer interaction interface, wherein the loading interface describes an interface name, an interface parameter, and the icon using an extensible mark-up language document, and wherein the human-computer interaction interface is configured to receive input from a user and feedback a running result to the user.

9. A server, comprising: a receiver configured to receive a retrieval request message from a terminal, wherein the retrieval request message comprises identification information of a to-be-processed service, and wherein the to-be-processed service is associated with and implemented by an application program that is installed on the terminal; a processor coupled to the receiver and configured to obtain, from a function library and according to the identification information of the to-be-processed service, a function corresponding to the identification information of the to-be-processed service, wherein the function is configured to be mounted onto the application program that corresponds to a blank startup window and that does not include any service processing functions, terminal, and wherein the identification information is obtained by: obtaining information about a sensor; and obtaining the identification information of the to-be-processed service according to the information about the sensor, wherein the information about the sensor comprises data information collected by the sensor and a function attribute of the sensor, and wherein obtaining the information about the sensor and obtaining the identification information of the to-be-processed service according to the information about the sensor comprises: determining, according to the function attribute of the sensor, that the data information does not satisfy a normal preset condition corresponding to the function attribute; obtaining a first keyword corresponding to the data information and at least one preset second keyword corresponding to the function attribute of the sensor based on the data information not satisfying the normal preset condition; and setting the first keyword and the at least one preset second keyword as the identification information of the to-be-processed service; and a transmitter coupled to the receiver and the processor and configured to send, to the terminal, a response message that comprises the function to cause the terminal to mount, using a loading interface from the response message, the function to a shell application that was previously installed on the terminal, wherein the function comprises attribute information, service logic, a human-computer interaction interface, and the loading interface, wherein the response message does not comprise an application installation package, and wherein an icon corresponding to the function replacesthe blank startup window after the function is mounted onto the shell application.

10. The server of claim 9, wherein the function library is located on the server and comprises one or more functions, and wherein the processor is further configured to:
- obtain attribute information of each function in the function library;
- compare the identification information of the to-be-processed service with the attribute information of each function in the function library to obtain similarity between the identification information of the to-be-processed service and the attribute information of each function; and
- determine a function corresponding to a highest similarity as the function.

* * * * *

UNITED STATES PATENT AND TRADEMARK OFFICE
CERTIFICATE OF CORRECTION

PATENT NO. : 11,647,108 B2
APPLICATION NO. : 16/084491
DATED : May 9, 2023
INVENTOR(S) : Zijun Li It is certified that error appears in the above-identified patent and that said Letters Patent is hereby corrected as shown below:

In the Claims

Claim 4, Column 31, Lines 17-18: "furthercomprising" should read "further comprising"

Claim 6, Column 31, Line 39: "obtainingthe information" should read "obtaining the information"

Claim 6, Column 31, Line 39: "and obtainingthe" should read "and obtaining the"

Claim 6, Column 31, Line 44: "attribute obtaining," should read "attribute; obtaining,"

Claim 6, Column 32, Line 5: "mount, usingthe" should read "mount, using the"

Claim 6, Column 32, Line 14: "invoke, usingthe" should read "invoke, using the"

Claim 8, Column 32, Line 26: "feedback" should read "feed back"

Claim 9, Column 33, Line 2: "replacesthe" should read "replaces the"

Signed and Sealed this
Fourth Day of July, 2023

Katherine Kelly Vidal
*Director of the United States Patent and Trademark Office*